(12) United States Patent
Heo et al.

(10) Patent No.: US 12,434,651 B1
(45) Date of Patent: Oct. 7, 2025

(54) AIRBAG COVER ASSEMBLY INCLUDING A LIGHTING MODULE

(71) Applicant: HYUNDAI MOBIS CO., LTD., Seoul (KR)

(72) Inventors: Jeong Mo Heo, Yongin-si (KR); Oh Koang Kwon, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 18/932,180

(22) Filed: Oct. 30, 2024

(30) Foreign Application Priority Data

May 24, 2024 (KR) .................. 10-2024-0067718

(51) Int. Cl.
 *B60R 21/203* (2006.01)
 *B60Q 3/283* (2017.01)
 *B60R 21/215* (2011.01)

(52) U.S. Cl.
 CPC ............ *B60R 21/203* (2013.01); *B60Q 3/283* (2017.02); *B60R 21/215* (2013.01); *B60R 2021/21543* (2013.01)

(58) Field of Classification Search
 CPC ... B60Q 3/283; B60R 21/203; B60R 21/2035; B60R 21/215; B60R 2021/21543
 See application file for complete search history.

(56) References Cited

U.S. PATENT DOCUMENTS

| | | | |
|---|---|---|---|
| 5,516,143 A * | 5/1996 | Lang | B60R 21/215 200/313 |
| 5,895,115 A * | 4/1999 | Parker | H01H 13/83 362/543 |
| 6,062,595 A * | 5/2000 | Ha | B60R 21/21658 200/61.54 |
| 7,441,801 B2 * | 10/2008 | Nakamura | B60Q 3/14 280/731 |
| 7,520,528 B2 * | 4/2009 | Nakamura | B60Q 5/003 280/731 |
| 7,866,858 B2 * | 1/2011 | Hirzmann | G09F 13/22 362/487 |
| 7,887,088 B2 * | 2/2011 | Worrell | B60Q 5/003 200/61.54 |
| 7,891,699 B2 * | 2/2011 | Worrell | B60R 21/21656 280/731 |
| 8,061,861 B2 * | 11/2011 | Paxton | B60Q 3/283 428/31 |
| 8,925,959 B2 * | 1/2015 | Bosch | B60R 21/203 40/593 |
| 9,067,556 B2 * | 6/2015 | Bosch | B60Q 3/283 |
| 10,272,869 B2 * | 4/2019 | Kanto | B60Q 1/0082 |
| 10,507,764 B2 * | 12/2019 | Schneider | B60Q 3/14 |
| 10,955,610 B2 * | 3/2021 | Kwon | B60Q 3/64 |
| 10,988,099 B2 * | 4/2021 | Ohki | B60R 13/005 |

(Continued)

FOREIGN PATENT DOCUMENTS

JP 2008143473 A * 6/2008

*Primary Examiner* — Laura Freedman
(74) *Attorney, Agent, or Firm* — NSIP Law

(57) ABSTRACT

An airbag cover assembly includes an airbag cover coupled to a steering wheel; and a lighting module disposed in the airbag cover. The lighting module includes a housing coupled to the airbag cover, and a light source unit coupled to the housing. The housing is disposed in the airbag cover and includes partition walls that divide an internal space of the airbag cover to define slots independently of or together with the airbag cover.

14 Claims, 3 Drawing Sheets

(56) References Cited

U.S. PATENT DOCUMENTS

| | | | | |
|---|---|---|---|---|
| 11,077,818 | B2* | 8/2021 | Murai | B60R 21/203 |
| 11,305,718 | B2* | 4/2022 | Ko | B60R 21/203 |
| 11,345,303 | B2* | 5/2022 | Kring | B60R 21/21658 |
| 11,383,639 | B1* | 7/2022 | Kwon | B60Q 3/64 |
| 11,628,780 | B2* | 4/2023 | Kim | B60R 21/21656 |
| | | | | 280/728.3 |
| 11,691,589 | B2* | 7/2023 | Kang | B60R 21/215 |
| | | | | 280/728.3 |
| 11,745,689 | B1* | 9/2023 | Kutchey | B60R 21/21656 |
| | | | | 280/728.3 |
| 11,754,262 | B1* | 9/2023 | Kang | B60R 21/215 |
| | | | | 362/511 |
| 11,780,399 | B2* | 10/2023 | Hatfield | B60R 21/215 |
| | | | | 280/728.3 |
| 11,820,315 | B2* | 11/2023 | Harm | B60R 21/2037 |
| 11,987,198 | B2* | 5/2024 | Wimbert | B60R 13/005 |
| 12,036,939 | B2* | 7/2024 | Min | B60R 21/203 |
| 12,275,364 | B2* | 4/2025 | Liu | B60K 35/10 |
| 12,311,842 | B2* | 5/2025 | Ko | B60Q 3/80 |
| 12,311,862 | B2* | 5/2025 | Choi | B60R 21/203 |
| 2009/0121459 | A1* | 5/2009 | Bostick | B60Q 3/16 |
| | | | | 280/728.3 |
| 2010/0107806 | A1* | 5/2010 | Corinaldi | B62D 1/046 |
| | | | | 74/552 |
| 2021/0061189 | A1* | 3/2021 | Fujimori | B60R 13/005 |
| 2021/0261081 | A1* | 8/2021 | Fujimura | B60R 21/2035 |
| 2022/0348136 | A1* | 11/2022 | Sang | G02B 6/006 |
| 2024/0181962 | A1* | 6/2024 | Kim | B62D 15/029 |
| 2024/0190367 | A1* | 6/2024 | Hwang | B60R 21/2037 |
| 2024/0412668 | A1* | 12/2024 | Kang | B60R 13/005 |

\* cited by examiner

AIRBAG COVER ASSEMBLY INCLUDING A LIGHTING MODULE

CROSS-REFERENCE TO RELATED APPLICATION(S)

The present application claims priority to and the benefit under 35 USC § 119 of Korean Patent Application No. 10-2024-0067718 filed on May 24, 2024, in the Korean Intellectual Property Office, the entire contents of which are hereby incorporated by reference for all purposes.

BACKGROUND

1. Field

The present invention relates to an airbag cover assembly.

2. Description of the Related Art

In general, a driver seat airbag device mounted in a vehicle instantaneously discharges gas in response to a signal from a collision sensor in the event of an accident of the vehicle and rapidly inflates a contracted airbag cushion, thereby protecting a driver. The driver seat airbag device may include a steering wheel having an internal space opened at one side, an airbag disposed in the internal space formed in the steering wheel, and an airbag cover configured to cover one opened side of the steering wheel.

Among the above-mentioned components, the airbag cover may not only cover one opened side of the steering wheel, but also accommodate a lighting device for improving a design. The lighting device may emit light toward a hole formed to be patterned on a part of the airbag cover. In addition, the lighting device may include a lighting emblem coupled to the airbag cover. The lighting emblem may be made of a material that may transmit light in comparison with a general emblem in the related art. Therefore, the light emitted from the lighting device may illuminate the lighting emblem.

However, the lighting emblem is heavier in weight than a general emblem in the related art. Therefore, there may occur a situation in which the airbag cover, which supports the lighting emblem, departs from the steering wheel when the airbag cover is cut by a deployment force of the airbag. This situation may cause a problem in that an occupant may be additionally injured when the airbag is deployed.

SUMMARY

The present invention is proposed to solve these problems and aims to provide an improved airbag cover assembly capable of ensuring deployment performance of an airbag by reducing a total weight of a lighting device coupled to an airbag cover.

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In a general aspect of the disclosure, an airbag cover assembly includes: an airbag cover configured to be coupled to a steering wheel; and a lighting module disposed in the airbag cover, wherein the lighting module includes: a housing coupled to the airbag cover; and a light source unit coupled to the housing, and wherein the housing is disposed in the airbag cover and comprises a plurality of partition walls configured to divide an internal space of the airbag cover to define a plurality of slots independently of or together with the airbag cover.

Each of the partition walls may guide a light source emitted from the light source unit in the airbag cover.

The housing may include a housing main body configured to support the partition wall and fixed to the airbag cover in the airbag cover.

The airbag cover may include a material that transmits light emitted from the light source unit.

The airbag cover assembly may further include a light mask disposed on an outer surface of the airbag cover and configured to selectively transmit or block light that is emitted from the light source unit and passes through the airbag cover.

The light mask may include a material that does not transmit light emitted from the light source unit.

The light mask may include pass holes configured to transmit light that is emitted from the light source unit and passes through the airbag cover.

The pass holes of the light mask may be disposed between the plurality of adjacent partition walls of the housing.

In another general aspect of the disclosure, an airbag cover assembly includes: an airbag cover coupled to a steering wheel; and a lighting module disposed in the airbag cover, wherein the lighting module includes: a housing coupled to the airbag cover; and a light source unit coupled to the housing, and wherein the housing is disposed in the airbag cover and comprises a plurality of partition walls configured to define a plurality of slots independently of or together with the airbag cover, and guide light emitted from the light source unit.

The airbag cover assembly may further include a light mask disposed on an outer surface of the airbag cover and configured to selectively transmit or block light that is emitted from the light source unit and passes through the airbag cover.

In yet another general aspect of the disclosure, an airbag cover assembly a vehicle includes: an airbag cover configured to be coupled to a steering wheel of the vehicle, the airbag cover including a top frame and one or more side frames; a lighting module disposed in the airbag cover and including light sources; partition walls that separate the light sources; a controller configured to control the light sources to emit light; and a light mask disposed over the top frame of the airbag cover.

The light mask may include pass holes respectively positioned over the light sources, wherein the light emitted by the light sources may be emitted through the top frame of the airbag cover and exiting through the pass holes of the light mask.

The light emitted by the light sources may be reflected by at least one or more of the side frames of the airbag cover, partition walls, or a combination thereof, and directed toward the pass holes of the light mask.

The airbag cover may include at least one of: a first material that transmits light emitted from the light sources; a second material that does not transmit light emitted from the light sources; or a combination thereof.

The controller may be further configured to control the light sources to selectively transmit light that passes through the airbag cover to form a visible light pattern.

The airbag cover assembly may further include slots defined by the airbag cover and the partition walls, wherein the pass hole may be respectively disposed above the slots.

DETAILED DESCRIPTION

Figure 1:
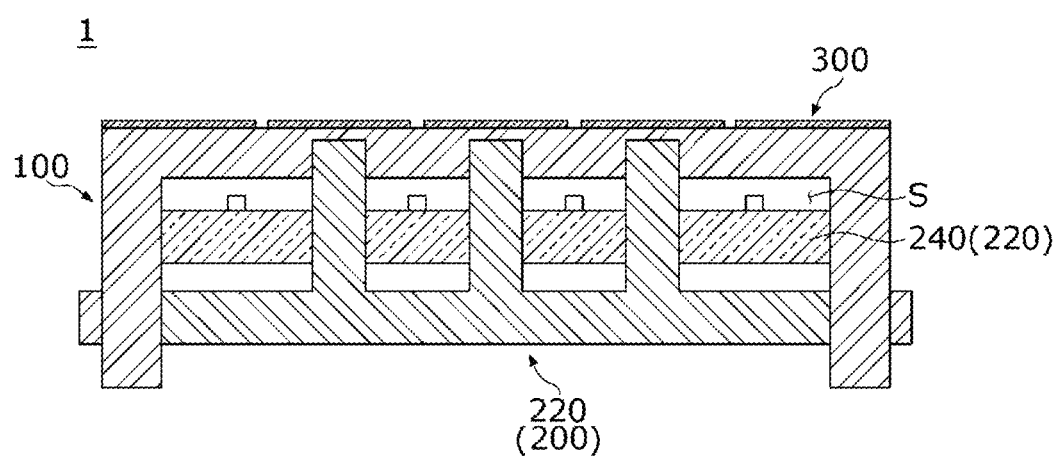
FIG. 1 is a cross-sectional view illustrating an airbag cover assembly according to an embodiment of the present invention.

The present invention may be variously modified and may have various embodiments, and particular embodiments illustrated in the drawings will be described below. However, the description of the embodiments is not intended to limit the present invention to the particular embodiments, but it should be understood that the present invention is to cover all modifications, equivalents and alternatives falling within the spirit and technical scope of the present invention.

The terms including ordinal numbers such as "first," "second," and the like may be used to describe various constituent elements, but the constituent elements are not limited by the terms. These terms are used only to distinguish one constituent element from another constituent element. For example, a second component may be named a first component, and similarly, the first component may also be named the second component, without departing from the scope of the present invention. The term "and/or" includes any and all combinations of a plurality of the related and listed items.

When one constituent element is described as being "coupled" or "connected" to another constituent element, it should be understood that one constituent element can be coupled or connected directly to another constituent element, and an intervening constituent element can also be present between the constituent elements. When one constituent element is described as being "coupled directly to" or "connected directly to" another constituent element, it should be understood that no intervening constituent element is present between the constituent elements.

In addition, in the description of the embodiments, the expression "one constituent element is provided or disposed above (on) or below (under) another constituent element" includes not only a case in which the two constituent elements are in direct contact with each other, but also a case in which one or more other constituent elements are (indirectly) provided or disposed between the two constituent elements. The expression "above (on) or below (under)" may mean a downward direction as well as an upward direction based on one constituent element.

The terminology used herein is used for the purpose of describing particular embodiments only and is not intended to limit the present invention. Singular expressions include plural expressions unless clearly described as different meanings in the context. The terms "comprises," "comprising," "includes," "including," "containing," "has," "having" or other variations thereof are inclusive and therefore specify the presence of stated features, integers, steps, operations, elements, components, and/or combinations thereof, but do not preclude the presence or addition of one or more other features, integers, steps, operations, elements, components, and/or combinations thereof.

Unless otherwise defined, all terms used herein, including technical or scientific terms, have the same meaning as commonly understood by those skilled in the art to which the present invention pertains. The terms such as those defined in a commonly used dictionary should be interpreted as having meanings consistent with meanings in the context of related technologies and should not be interpreted as ideal or excessively formal meanings unless explicitly defined in the present application.

Hereinafter, an airbag cover assembly will be described in detail with reference to the accompanying drawings. The same or corresponding constituent elements are assigned with the same reference numerals regardless of reference numerals, and the repetitive description thereof will be omitted.

Figure 2:
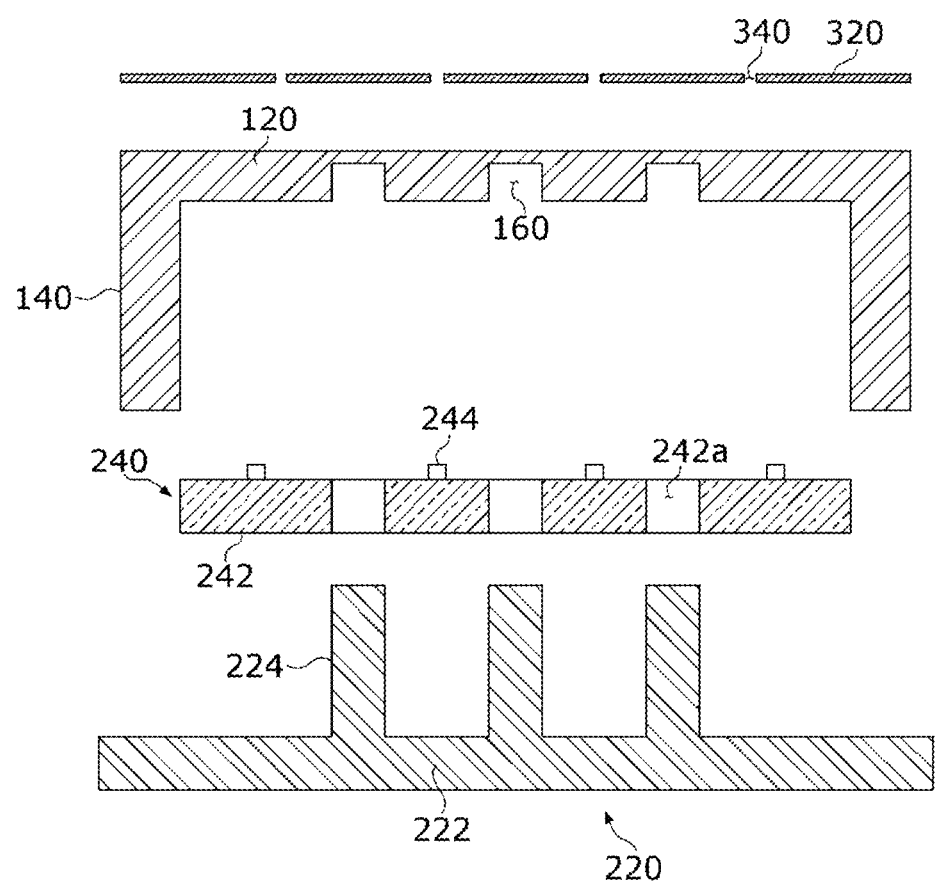
FIG. 2 is an exploded cross-sectional view of the airbag cover assembly.

FIG. 1 is a cross-sectional view illustrating an airbag cover assembly according to an embodiment of the present invention, and FIG. 2 is an exploded cross-sectional view of the airbag cover assembly.

With reference to FIGS. 1 and 2, an airbag cover assembly 1 according to an embodiment of the present invention may be a partial component of a steering system (not illustrated) of a vehicle. In addition, the airbag cover assembly 1 may accommodate therein an airbag for protecting an occupant seated in a driver seat. The airbag cover assembly 1 may include an airbag cover 100, a lighting module 200, and a light mask 300.

The airbag cover 100 may be coupled to a steering wheel (not illustrated). The airbag cover 100 may accommodate the lighting module 200 therein. The airbag cover 100 may include a top frame 120, a side frame 140, and a first coupling portion 160. The airbag cover 100 may be made of a material that transmits light emitted from a light source unit 240 to be described below. In more detail, the top frame 120 of the airbag cover 100 may be made of a material that transmits light, and the side frame 140 may be made of a material that reflects light. However, the present invention is not limited thereto. In addition, the airbag cover 100 may be formed by an injection molding process.

The top frame 120 may be a portion visible to the occupant together with the steering wheel, and the top frame 120 may be supported by the side frame 140. In addition, the top frame 120 may support the light mask 300. The top frame 120 may cover one opened side of the side frame 140.

The side frame 140 may be a portion integrated with the top frame 120, and the side frame 140 may support the top frame 120. The side frame 140 may have a shape having an empty interior. Therefore, the side frame 140 may have a space that accommodates the lighting module 200 therein.

The first coupling portion 160 may be formed in the top frame 120. The first coupling portion 160 may be formed in an inner surface of the top frame 120 that is not visible to the occupant. The first coupling portion 160 may have a shape formed concavely from the inner surface of the top frame 120. That is, the first coupling portion 160 may be a groove. The first coupling portion 160 may be provided as a plurality of first coupling portions 160. The plurality of first coupling portions 160 may be disposed to be spaced apart from one another. The plurality of first coupling portions 160 may accommodate therein ends of partition walls 224 to be described below.

The lighting module 200 may be disposed in the airbag cover 100. In more detail, the lighting module 200 may be disposed in the airbag cover 100. The lighting module 200 may include a housing 220 and the light source unit 240.

The housing 220 may be coupled to the airbag cover 100. The housing 220 may include a housing main body 222 and the partition wall 224.

The housing main body 222 may be disposed in the side frame 140 of the airbag cover 100. The housing main body 222 may be coupled to the side frame 140 of the airbag cover 100 through a hole formed at an end thereof. However, the present invention is not limited thereto. Therefore, the housing main body 222 may be disposed in the airbag cover 100 and fixed to the airbag cover 100. The housing main body 222 may be disposed in parallel with the top frame 120 of the airbag cover 100. However, the present invention is not limited thereto.

The housing main body 222 may be a circular or rectangular plate. The housing main body 222 may support a substrate 242 of the light source unit 240 that will be described below. A groove may be formed in the housing main body 222 to support the substrate 242. However, the present invention is not limited thereto. The housing main body 222 may support the partition wall 224.

The partition wall 224 may be disposed in the airbag cover 100. The partition wall 224 may be integrated with the housing main body 222. The partition wall 224 may be provided as a plurality of partition walls 224. The plurality of partition walls 224 may be disposed to be spaced apart from one another. In this case, an interval at which the plurality of partition walls 224 are spaced apart from one another may be equal to an interval at which the first coupling portions 160 of the airbag cover 100 are spaced apart from one another. The partition wall 224 may be made of a material that may reflect light emitted from the light source unit 240.

The partition walls 224 may divide an internal space of the airbag cover 100 to define a plurality of slots S independently of or together with the airbag cover 100. In more detail, the partition wall 224, which faces the side frame 140 of the airbag cover 100 among the plurality of partition walls 224, may define the slot S together with the side frame 140 of the airbag cover 100. The partition wall 224 may be supported by the airbag cover 100 as an end of the partition wall 224 is accommodated in the first coupling portion 160 of the airbag cover 100. Therefore, the slot S may be a space defined by the top frame 120 of the airbag cover 100 and the housing main body 222 and the partition wall 224 of the housing 220 of the lighting module 200. In addition, the slot S may be a space defined by the top frame 120 of the airbag cover 100, the housing main body 222 and the partition wall 224 of the housing 220 of the lighting module 200, and the side frame 140 of the airbag cover 100.

The light source unit 240 may be coupled to the housing 220. The light source unit 240 may include the substrate 242 and a light source 244.

The substrate 242 may be a printed circuit board 242. The substrate 242 may be disposed in the side frame 140 of the airbag cover 100. The substrate 242 may support the light source 244. The substrate 242 may be connected to an external power supply device (not illustrated) and supplied with power from the power supply device (not illustrated). The substrate 242, which is supplied with power, may transmit a control signal for operating the light source 244 to the light source 244.

The substrate 242 may include a second coupling portion 242a. The second coupling portion 242a may be provided as a plurality of second coupling portions 242a formed in the substrate 242. The second coupling portion 242a may be a hole formed in the substrate 242. The second coupling portion 242a may have a shape corresponding to a shape of the partition wall 224. When the partition wall 224 passes through the second coupling portion 242a, the substrate 242 may be fixed to the housing 220. In addition, although not illustrated, the substrate 242 may be accommodated in the groove formed in the housing main body 222 of the housing 220.

The light source 244 may be disposed on the substrate 242. The light source 244 may be coupled to the substrate 242 and create light in response to a control signal transmitted from the substrate 242. The light source 244 may include a light-emitting diode (LED).

The light source 244 may be provided as a plurality of light sources 244, and the plurality of light sources 244 may be disposed to be spaced apart from one another. In this case, the light source 244 may be disposed between the partition walls 224 or between the partition wall 224 and the side frame 140 of the airbag cover 100. In more detail, the light source 244 may be disposed in each of the slots S defined by the airbag cover 100 and the housing 220 in the state in which the light source 244 is disposed on the substrate 242. Therefore, in the state in which the light source 244 is disposed in each of the slots S, the light emitted from the light source 244 may move toward the top frame 120 and the side frame 140 of the airbag cover 100 and the partition wall 224 of the housing 220.

The light mask 300 may be disposed on an outer surface of the airbag cover 100. More specifically, the light mask 300 may be disposed on an outer surface of the top frame 120 of the airbag cover 100 that is exposed to the occupant. The light mask 300 may include a mask main body 320 and pass holes 340.

The mask main body 320 may define an external appearance of the light mask 300. The mask main body 320 may have an area corresponding to an area of the top frame 120 of the airbag cover 100. However, the present invention is not limited thereto. The mask main body 320 may be a film. The mask main body 320 is positioned on the outer surface of the top frame 120 during a process of injection-molding the airbag cover 100, such that the mask main body 320 may be coupled to the top frame 120 so as to be disposed on the top frame 120 of the airbag cover 100. More specifically, the mask main body 320 may be coupled to the top frame 120 of the airbag cover 100 by an insert mold decoration (IMD) process method. The mask main body 320 may be made of a material that does not transmit light emitted from the light source unit 240. Therefore, the light passing through the top frame 120 of the airbag cover 100 may be reflected by the mask main body 320.

The pass hole 340 may be formed in the mask main body 320. The pass hole 340 may be provided as a plurality of pass holes 340. The plurality of pass holes 340 may be disposed to be spaced apart from one another so as to have a predetermined pattern during a manufacturing process. The light, which is emitted from the light source unit 240 and passes through the airbag cover 100, may pass through the pass hole 340.

The pass holes 340 may be disposed between the plurality of adjacent partition walls 224 of the housing 220. In more detail, the pass hole 340 may be disposed between the partition walls 224. That is, the pass hole 340 may be disposed above each of the slots S defined by the airbag cover 100 and the partition walls 224 of the housing 220. In addition, the pass hole 340 may be disposed at a position that faces the light source 244. In addition, the pass hole 340 may be disposed between the first coupling portions 160 formed in the top frame 120 of the airbag cover 100.

Hereinafter, a path along which the light emitted from the light source unit 240 moves.

Figure 3:
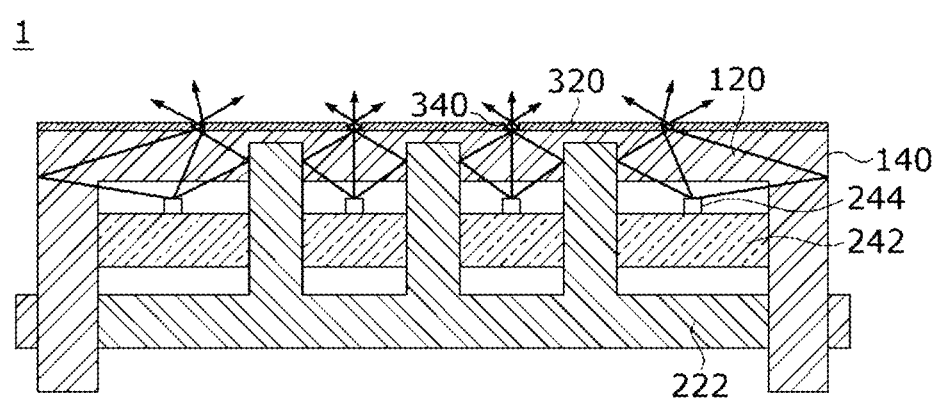
FIG. 3 is a view illustrating a path of light emitted from a light source unit.

FIG. 3 is a view illustrating the path of the light emitted from the light source unit 240.

With reference to FIGS. 1 to 3, when power is supplied from the external power supply device, the substrate 242 is supplied with power and transmits an operating signal to the light source 244. The light source 244, which receives the operating signal, creates light. In this case, as illustrated in FIG. 3, the light may move in the slot S. In more detail, the light may move toward the top frame 120 of the airbag cover 100 or move toward the partition wall 224, which defines the slot S, or the side frame 140 of the airbag cover 100 and collide with the partition wall 224.

First, the light, which has moved toward the top frame 120 of the airbag cover 100, may move to pass through the top frame 120 of the airbag cover 100 made of a material that transmits light. As described above, the light, which moves to pass through the top frame 120, reaches the light mask 300.

In this case, the light, which has reached the mask main body 320 of the light mask 300, is reflected after colliding with the mask main body 320 made of a material that does not transmit light, and then the light moves in the mask main body 320. Therefore, the light, which collides with the mask main body 320, cannot move to the outside of the airbag cover 100. However, in case that the light, which has reached the mask main body 320 of the light mask 300, passes through the pass holes 340, the light having passed through the pass holes 340 may move to the outside of the airbag cover 100 and illuminate a partial region of a passenger room of the vehicle.

Next, the light moves toward the partition wall 224, which defines the slot S, or the side frame 140 of the airbag cover 100. Because the partition wall 224 or the side frame 140 is made of a material that may reflect light, the light, which has collided with the partition wall 224 or the side frame 140, is reflected and moves toward the top frame 120 of the airbag cover 100. The light, which propagates toward the top frame 120 of the airbag cover 100, passes through the top frame 120 and then collides with the mask main body 320 of the light mask 300 as described above, such that the light cannot move to the outside of the airbag cover 100. Alternatively, the light may pass through the pass hole 340, move to the outside of the airbag cover 100, and illuminate a partial region of the passenger room of the vehicle.

As described above, the airbag cover assembly 1 according to the embodiment of the present invention may have the partition walls 224 provided in the airbag cover 100 and configured to guide the light sources 244 emitted from the light source unit 240. Therefore, a movement direction of the light moving in the airbag cover 100 may be guided, such that a loss of light may be reduced, and the amount of light emitted to the outside of the airbag cover 100 may be maintained.

In addition, the airbag cover assembly 1 according to the embodiment of the present invention may have the light mask 300 capable of selectively transmitting or blocking the light that is emitted from the light source unit 240 and passes through the airbag cover 100. Therefore, the intended light pattern may be implemented during the manufacturing process, thereby providing aesthetic satisfaction to the occupant. A controller or processor (not shown) may be included in the airbag cover assembly 1 to control the light sources to emit light, and the controller may be configured to control the lighting module 200 to selectively transmit light that is emitted from the light source unit and passes through the airbag cover, to provide a desired light pattern visible to the user.

In addition, the airbag cover assembly 1 according to the embodiment of the present invention may use the light mask 300 made of a film material lighter in weight than a lighting emblem used for an airbag cover assembly in the related art. Therefore, the steering wheel becomes lighter in weight than the airbag cover assembly in the related art, which may prevent the separation of the airbag cover 100 when the airbag is deployed. Therefore, it is possible to prevent a situation in which the occupant collides with the airbag cover 100 and is additionally injured when the airbag is deployed.

According to the embodiment of the present invention, it is possible to use the light mask made of a film material lighter in weight than a lighting emblem used for an airbag cover assembly in the related art. Therefore, the steering wheel becomes lighter in weight than the airbag cover assembly in the related art, which may prevent the separation of the airbag cover when the airbag is deployed. Therefore, it is possible to prevent a situation in which the occupant collides with the airbag cover and is additionally injured when the airbag is deployed.

While the present invention has been described above with reference to the exemplary embodiments, it may be understood by those skilled in the art that the present invention may be variously modified and changed without departing from the spirit and scope of the present invention disclosed in the claims. Further, it should be interpreted that the differences related to the modifications and alterations are included in the scope of the present invention defined by the appended claims.

DESCRIPTION OF REFERENCE NUMERALS

1: Airbag cover assembly
100: Airbag cover
120: Top frame
140: Side frame
160: First coupling portion
200: Lighting module
220: Housing
222: Housing main body
224: Partition wall
240: Light source unit
242: Substrate
242a: Second coupling portion
244: Light source
300: Light mask
320: Mask main body
340: Pass hole
S: Slot

What is claimed is:
1. An airbag cover assembly comprising:
an airbag cover configured to be coupled to a steering wheel; and
a light mask disposed on the airbag cover and including one or more pass holes; and
a lighting module disposed in the airbag cover,
wherein the lighting module comprises:
a housing coupled to the airbag cover; and
a light source unit coupled to the housing, and
wherein the housing is disposed in the airbag cover and comprises a plurality of partition walls configured to divide an internal space of the airbag cover to define a plurality of slots independently of or together with the airbag cover, and
wherein the light source unit is configured to emit light that travels directly to the pass holes and light that is reflected by the partition walls toward the pass holes.

2. The airbag cover assembly of claim 1, wherein the housing comprises a housing main body configured to support the partition walls and fixed to the airbag cover in the airbag cover.

3. The airbag cover assembly of claim 1, wherein the airbag cover comprises a material that transmits light emitted from the light source unit.

4. The airbag cover assembly of claim 1,
wherein the light mask is disposed on an outer surface of the airbag cover and configured to selectively transmit or block the light that is emitted from the light source unit and passes through the airbag cover.

5. The airbag cover assembly of claim 4, wherein the light mask comprises a material that does not transmit light emitted from the light source unit.

6. The airbag cover assembly of claim 4, wherein the pass holes are configured to transmit light that is emitted from the light source unit and passes through the airbag cover.

7. The airbag cover assembly of claim 6, wherein the pass holes of the light mask are disposed between the plurality of adjacent partition walls of the housing.

8. An airbag cover assembly comprising:
an airbag cover coupled to a steering wheel; and
a light mask disposed on the airbag cover and including one or more pass holes; and
a lighting module disposed in the airbag cover,
wherein the lighting module comprises:
  a housing coupled to the airbag cover; and
  a light source unit coupled to the housing, and
wherein the housing is disposed in the airbag cover and comprises a plurality of partition walls configured to define a plurality of slots independently of or together with the airbag cover, and guide light emitted from the light source unit, and
wherein the light source unit is configured to emit light that travels directly to the pass holes and light that is reflected by the partition walls toward the pass holes.

9. The airbag cover assembly of claim 8,
wherein the light mask is disposed on an outer surface of the airbag cover and configured to selectively transmit or block light that is emitted from the light source unit and passes through the airbag cover.

10. An airbag cover assembly for a vehicle, the air bag cover assembly comprising:
an airbag cover configured to be coupled to a steering wheel of the vehicle, the airbag cover including a top frame and one or more side frames;
a lighting module disposed in the airbag cover and including light sources;
partition walls to separate the light sources;
a controller configured to control the light sources to emit light; and
a light mask disposed over the top frame of the airbag cover and including pass holes,
wherein the light sources are configured to emit light that travels directly to the pass holes and light that is reflected by the partition walls toward the pass holes.

11. The air bag cover assembly of claim 10,
wherein the pass holes are respectively positioned over the light sources, and
wherein light emitted by the light sources are emitted through the top frame of the airbag cover and exit through the pass holes of the light mask.

12. The airbag cover assembly of claim 11, further comprising:
slots defined by the airbag cover and the partition walls,
wherein the pass holes are respectively disposed above the slots.

13. The air bag cover assembly of claim 10, wherein the airbag cover comprises at least one of:
a first material that transmits light emitted from the light sources;
a second material that does not transmit light emitted from the light sources; or
a combination thereof.

14. The airbag cover assembly of claim 10, wherein the controller is further configured to control the light sources to selectively transmit light that passes through the airbag cover to form a visible light pattern.

* * * * *